US005189604A

United States Patent [19]
Lovrenich

[11] Patent Number: 5,189,604
[45] Date of Patent: * Feb. 23, 1993

[54] DISTRIBUTED LOGIC CONTROL SYSTEM AND METHOD

[75] Inventor: Rodger T. Lovrenich, Santa Teresa, N. Mex.

[73] Assignee: El Paso Technologies Company, El Paso, Tex.

[*] Notice: The portion of the term of this patent subsequent to Aug. 15, 2006 has been disclaimed.

[21] Appl. No.: 630,232

[22] Filed: Dec. 19, 1990

Related U.S. Application Data

[60] Division of Ser. No. 463,868, Jan. 5, 1990, abandoned, which is a continuation of Ser. No. 340,435, Apr. 19, 1989, abandoned, which is a continuation of Ser. No. 38,018, Apr. 14, 1987, Pat. No. 4,858,102, which is a continuation-in-part of Ser. No. 757,279, Jul. 19, 1985, abandoned.

[51] Int. Cl.$^5$ .............................................. G06F 15/46
[52] U.S. Cl. ................................... 364/136; 364/141; 364/147; 364/183; 364/184; 364/185
[58] Field of Search .................... 364/136, 141, 474.2, 364/153, 474.11, 200 MS File, 900 MS File, 183, 184, 185, 147

[56] References Cited

U.S. PATENT DOCUMENTS

| | | | |
|---|---|---|---|
| 3,795,916 | 3/1974 | Wallace et al. | 364/153 |
| 4,314,329 | 2/1982 | Crewe et al. | 364/141 |
| 4,608,628 | 8/1986 | Saito et al. | 364/141 |
| 4,723,219 | 2/1988 | Beyer et al. | 364/474.2 |
| 4,858,102 | 8/1989 | Lovrenich | 364/474.11 |

OTHER PUBLICATIONS

O'Connor, Alan Joseph, "A CRT-Based State Transition Language for Industrial Sequential Control", Jun. 1981.
Walker, G. R., "The Formal Specification and Control of Sequential Processes Using the State Method", Jun. 1978.
Wolfe, P. P., "A Computer Language for Control of Autonomous Industrial Equipment", Jun. 1973.
"State Transition Synthesis for Sequential Control of Discrete Machines", Hopkins, Jr. et al, '73.

*Primary Examiner*—Jerry Smith
*Assistant Examiner*—Jim Trammell
*Attorney, Agent, or Firm*—Donald J. Lisa

[57] ABSTRACT

A system and method for controlling operation of a plurality of elements in an automated process, such as a production process, and indicating error conditions as they occur. Each unique set of input and output conditions of the various system elements defines a unique logic state or zone. Thus, there are defined a multiplicity of valid system logic states or zones, each having a unique input/output image. A predetermined sequence of zones, productive zones representing designed machine operations, is stored in a zone table. All zones not explicitly defined in the zone table are automatically treated as error zones. A zone engine automatically cycles to observe any change in input/output image. Any change in inputs from the various system elements automatically transfer action to the unique zone associated with such inputs, resulting in corresponding changes in control outputs to the system elements and/or display an error message as appropriate.

21 Claims, 11 Drawing Sheets

| MECHANISM ZONE TABLE | MECHANISM NAME __SLIDE__ |
|---|---|
| | APPLICABLE STATIONS _____ |

| ZONE NUMBERS (REF) | ZONE NAMES | I/O NAMES | ADVANCED UNIT SWITCH | RETURNED UNIT SWITCH | ADVANCE MOTION PWR | RETURN MOTION PWR | | | |
|---|---|---|---|---|---|---|---|---|---|
| | | 1 | 1 | 0 | 0 | | | | |
| 1 | RETURNED | 0 | 1 | 0 | 0 | | | | |
| 2 | STOPPED BETWEEN | 0 | 0 | 0 | 0 | | | | |
| 3 | ADVANCED | 1 | 0 | 0 | 0 | | | | |
| 4 | ADVANCING FROM RETURNED | 0 | 1 | 1 | 0 | | | | |
| 5 | ADVANCING BETWEEN | 0 | 0 | 1 | 0 | | | | |
| 6 | ADVANCING ON TO ADVANCED | 1 | 0 | 1 | 0 | | | | |
| 7 | RETURNING ONTO RETURNED | 0 | 1 | 0 | 1 | | | | |
| 8 | RETURNING BETWEEN | 0 | 0 | 0 | 1 | | | | |
| 9 | RETURNING FROM ADVANCED | 1 | 0 | 0 | 1 | | | | |
| 10 | ERROR | X | X | 0 | 0 | | | | |

LEGEND: [0] MUST BE OFF  [1] MUST BE ON  [X] IGNORE

FIG. 4B

| MECHANISM ZONE TABLE | MECHANISM NAME: _____  STATION NAME: 5L | | | |
|---|---|---|---|---|
| ZONE NUMBERS (REF) | I/O TYPE<br>I = PHYSICAL INPUT<br>C = COMMAND INPUT<br>O = PHYSICAL OUTPUT<br>R = REQUEST OUTPUT<br>M = MOS (MACHINE OPERATING SYSTEM) OUTPUTS | I/O NAMES ②<br>ERROR RESET | ADVANCE SLIDE | RETURN SLIDE |
| | ZONE NAMES ① | C | C | C |
| 1 | INITIALIZING | X | X | X |
| 2 | RETURNED | X | 0 | X |
| 3 | ADVANCING FROM RETURNED | X | 1 | X |
| 4 | ADVANCING BETWEEN | X | 1 | X |
| 5 | ADVANCED | X | X | 0 |
| 6 | RETURNING FROM ADVANCED | X | X | 1 |
| 7 | RETURNING BETWEEN | X | X | 1 |
| 8 | STOPPED BETWEEN | X | 0 | 0 |
| 9 | COASTING TO STOP | X | X | X |
| 10 | ERROR DEFAULT ③ | 0 | X | X |

LEGEND:  [0] MUST BE OFF    [1] MUST BE ON

FIG. 7A

| MECHANISM ZONE TABLE | MECHANISM NAME: _____ STATION NAME: _____ | | | | | | |
|---|---|---|---|---|---|---|---|
| I/O TYPE | | | | | | | |
| I = PHYSICAL INPUT<br>C = COMMAND INPUT<br>O = PHYSICAL OUTPUT<br>R = REQUEST OUTPUT<br>M = MOS (MACHINE OPERATING SYSTEM) OUTPUTS | I/O NAMES → | ERROR RESET | ADVANCE SLIDE | RETURN SLIDE | ADVANCED UNIT SWITCH | RETURNED UNIT SWITCH | |
| ZONE NUMBERS (REF) / ZONE NAMES ① | | C | C | C | 1 | 1 | |
| 1 INITIALIZING | | X | X | X | X | X | |
| 2 RETURNED | | X | 0 | X | 0 | 1 | |
| 3 ADVANCING FROM RETURNED | | X | 1 | X | 0 | 1 | |
| 4 ADVANCING BETWEEN | | X | 1 | X | 0 | 0 | |
| 5 ADVANCED | | X | X | 0 | 1 | 0 | |
| 6 RETURNING FROM ADVANCED | | X | X | 1 | 1 | 0 | |
| 7 RETURNING BETWEEN | | X | X | 1 | 0 | 0 | |
| 8 STOPPED BETWEEN | | X | 0 | 0 | 0 | 0 | |
| 9 COASTING TO STOP | | X | X | X | X | X | |
| 10 ERROR: DEFAULT | | O | X | X | X | X | |

LEGEND: [0] MUST BE OFF    [1] MUST BE ON

TRANSITION TO ERROR ZONE CAUSES MESSAGE PROCESS TO COMPOSE AN ERROR MESSAGE

FIG. 9A

DISTRIBUTED LOGIC CONTROL SYSTEM AND METHOD

RELATED APPLICATIONS

This application is a division of application Ser. No. 463,868 filed Jan. 5, 1990 now abandoned which is a continuation of application Ser. No. 340,435 filed Apr. 19, 1989, now abandoned, which is a continuation of application Ser. No. 038,018 filed Apr. 14, 1987, now U.S. Pat. No. 4,858,102, which in turn is a continuation-in-part of application Ser. No. 757,279 filed Jul. 19, 1985, now abandoned.

Reference is also made to application Ser. Nos. 700,456 filed Feb. 11, 1985, now U.S. Pat. No. 4,621,200, 757,225 filed Jul. 19, 1985 abandoned, 248,772 filed Sep. 23, 1988 abandoned, and 595,785 filed Oct. 9, 1990, now U.S. Pat. No. 5,121,331.

The present invention relates to system and methods for controlling automated production lines and the like.

BACKGROUND OF THE INVENTION

Automated production lines typically include many stations at which work is performed on a workpiece by a series of tools. A workpiece is clamped in position at each work station, and the tools at the several work stations engage the workpieces. The tool is then withdrawn at each work station, and the workpieces are unclamped and transferred simultaneously to the next work stations by a single transer mechanism. The automative industry is an example of an industry with high usage of automated production lines to produce engine blocks, for example. An engine block casting is passed successively through a series of work stations which mill, bore, drill, hone, gage, etc. It is not uncommon to have sixty work stations in such an automated production line. The times required to perform the several operations may be different, but the parts cannot be unclamped and transferred until all stations are finished because motion of a single transfer mechanism moves all parts.

Individual machine control systems generally include an automatic mode of operation wherein the machine is automatically cycled through a work sequence. Relay ladder logic commonly has been used to define the machine sequences, whether the logic is effected by relays or programmable controllers. The typical relay ladder logic diagram is a massive listing of relay, switch and solenoid conditions without an indication of logic flow which, while easy to read, is difficult to translate into the logic conditions intended to be represented. In addition, a large number of implied conditions exist that are not depicted. For example, a relay ladder with twenty elements (switches, relays, solenoids, etc.) embraces well over one million possible combinations of conditions. As a practical matter only a small fraction of these conditions, those necessary to make the system work, are considered by the machine designer and encoded into the logic scheme. Potential problems abound. Some planned conditions may be omitted, and unplanned conditions may be present, all with potentially serious consequences.

The programmable logic controller (PLC) was introduced with the hope that the massive racks of relays wired together in a permanent logic network could be replaced by a more reliable, smaller and readily reprogrammable electronic package. Although the PLC was designed to replace relay controls, its design explicitly seeks to replicate, in the design media, the relay ladder logic used by the technicians. Reprogrammability has proven to be a mixed blessing. Initial reprogramming is always needed as the system is set up and to meet product design changes. Any change made to the program logic requires a corresponding modification to associated diagnostic programming so the latter can properly reflect errors in the altered logic. The ease of making changes can allow modifications to be made by any semi-qualified person. Unfortunately, there is often no automatic record of changes made, and there is therefore the possibility that the documentation may not reflect the actual program. This is a sufficiently serious problem for many production facilities that they are investing heavily in add-on equipment to monitor program changes. Furthermore, the increase in number of Input/Output (I/O) points desired by users and consequent greater complexity of controls have driven PLC manufacturers to push the PLC design to larger and larger units. These very large units are well designed to meet the needs of central chemical plant control rooms, for example, but are too slow for the fast-cycle automation, such as transfer lines.

A significant cost of automated production lies in system "down-time"—i.e. time in which the automated system is non-productive—which may range between 50% and 60% during production shifts. Total down-time may be visualized as consisting of three segments: diagnosis, repair and restart. Analyses show that there are many causes of down-time including: many potential sources of unintended stoppage, variable delays in bringing the appropriate skills to bear on the problem, repair times that vary from minutes to hours, and a significant restart time needed to return the machine to a "ready for automatic cycle" condition after all repairs have been made. Down-time is a direct consequence of the high degree of complexity required to perform a large number of machining and part handling operations with the minimum of operator intervention. While lower equipment failure rates are a high priority objective, it is widely believed that reducing time to return to production—i.e., restart time —is the major area of opportunity for improvement.

Thus, a particular problem which has plagued the art involves restart up of an automated system after shutdown. Typically, operators or technicians must examine the status of workpieces at the individual stations and manually cycle the individual stations so that all stations are at a common point in the overall operating cycle. In a system which includes sixty work stations, for example, substantial time is required to restart the system in this manner after shutdown. Furthermore, in the event that an error is made and a workpiece is transferred to the next work station without the previous operation having been performed, substantial damage is likely to both the workpiece and the operating mechanism at the station, resulting not only in further shutdown of the system but in costly repair.

OBJECTS AND SUMMARY OF THE INVENTION

It is therefore a general object of the present invention to provide a control system and method of the described type which are characterized by increased efficiency, speed and reliability, and by decreased cost and complexity.

A more specific object of the invention is to provide a distributed machine control system and method which are constructed in such a way as to be automatically self-diagnostic or "autonostic" in operation, which provide to the operator a clear concise English-language explanation of the cause of failure, and which are thus effective in reducing time required to diagnose the cause of a system failure.

A further and yet more specific object of the invention is to provide a control system and method wherein each work station contains a complete history of system operations performed on the workpiece at that station, so that the work station will not perform its operation on the workpiece in the event that preceding prerequisite operations have not been performed, and so that the system restart can be implemented automatically without requiring visual inspection and manual intervention by operators or technicians.

The present invention is directed to a system and method for controlling operation of a plurality of elements in an automated process, such as a production process, and indicating error conditions as they occur. In accordance with the invention, the machine system is divided into a plurality of individually controlled "mechanisms." A "mechanism" is a single action device—i.e., having a single motion—which cannot interfere with itself. In the example discussed in detail, such mechanism comprises a ream slide which moves toward a workpiece to bring the reaming bit into working engagement, and then moves to a returned position spaced from the workpiece so that the piece may be transferred. The ream motor carried by the slide, if controlled, would be a separate "mechanism" because a different motion is involved. Likewise, the workpiece clamp at the reaming station would comprise a separate "mechanism."

Each unique set of input and output conditions of the various mechanism elements defines a unique logic state or zone. Thus, there are defined a multiplicity of valid mechanism logic states or zones, each having a unique input/output image and each corresponding to a valid physical state of the mechanism. A predetermined sequence of zones, productive zones representing designed mechanism operating states, is stored in a zone table. All zones not explicitly defined in the zone table are automatically treated as error zones. A zone engine automatically cycles to observe any change in mechanism input/output image. Any change in inputs from the various mechanism elements automatically transfers action to the unique zone associated with such inputs, resulting in corresponding changes in control outputs to the mechanism elements and/or display of an error message as appropriate.

Zone logic operation so described possesses a number of distinct advantages over the art. For example, every change in I/O image automatically transfers operation to a succeeding zone. If the nex zone is a valid zone operation proceeds. However, if the next zone is an error zone, the I/O image which led to entry into the error zone provides a ready indication of the source of mechanism failure. Thus, diagnostic time is reduced. Furthermore, by programming the system mechanism as a function of constraints rather than timed actions, the individual mechanism, and hence the overall system, automatically operate at maximum speed.

In accordance with another feature of the invention for automatic generation of error messages, each logic zone and each input/output image has associated therewith a verbal description according to its function, for example "valve seat ream mechanical slide" in the example of the disclosure. Motion or action zones have associated verb phases, such as "advancing between" and input and output (I/O) elements are named with nouns such as "advanced limit switch", etc. The zone engine continually examines the actions taking place or the lack of action, and the conditions of the mechanism elements. When a fault occurs, i.e. when the combination of action and element conditions does not represent a productive situation, the names of the zones and inputs and outputs are combined to automatically compose a unique readily understood error message complete with verbs, nouns and objects in accordance with standard language construction. If system programming is changed by the designer, the diagnostics and error message composition automatically follow with no additional programming. The system will automatically compose its own unique error message in accordance with the changes.

A machine control system in accordance with a preferred embodiment of the present invention includes a plurality of work stations each for performing a preselected operation on a workpiece, such as drilling, reaming or tapping a hole, and a transfer mechanism for transferring a series of workpieces among the work stations in a predetermined sequence. Each of the work stations includes at least one mechanism for performing the preselected operation on a workpiece at the associated work station and an electronic controller for controlling operation of the mechanism. The electronic controllers are electrically serially interconnected to each other. Each controller includes a system memory section which includes a complete record of operations performed on all workpieces in the system. This record is updated following each machine cycle. Thus, in the event of shut-down, each station contains information necessary for restart relative to the workpiece at that station.

In accordance with another feature of the invention, the part history record is employed at each work station to inhibit operation of the mechanism in the event that prerequisite previous operations have not been performed. For example, in the example of a valve seat reaming station, operation of the reaming slide against the workpiece is inhibited if the history of the workpiece indicates that the hole has not been drilled at a previous station.

BRIEF DESCRIPTION OF THE DRAWINGS

The invention, together with additional objects, features and advantages thereof, will be best understood from the following description, the appended claims and the accompanying drawings in which:

FIG. 4B is a corresponding zone table illustration;

FIGS. 7a–7c are functional block diagram illustrating the error message generator at the orchestrator computer in FIG. 1;

FIGS. 9a–9b illustrate error message operation at the orchestrator for an exemplary failure at the ream slide station.

DETAILED DESCRIPTION OF PREFERRED EMBODIMENT

Figure 1:
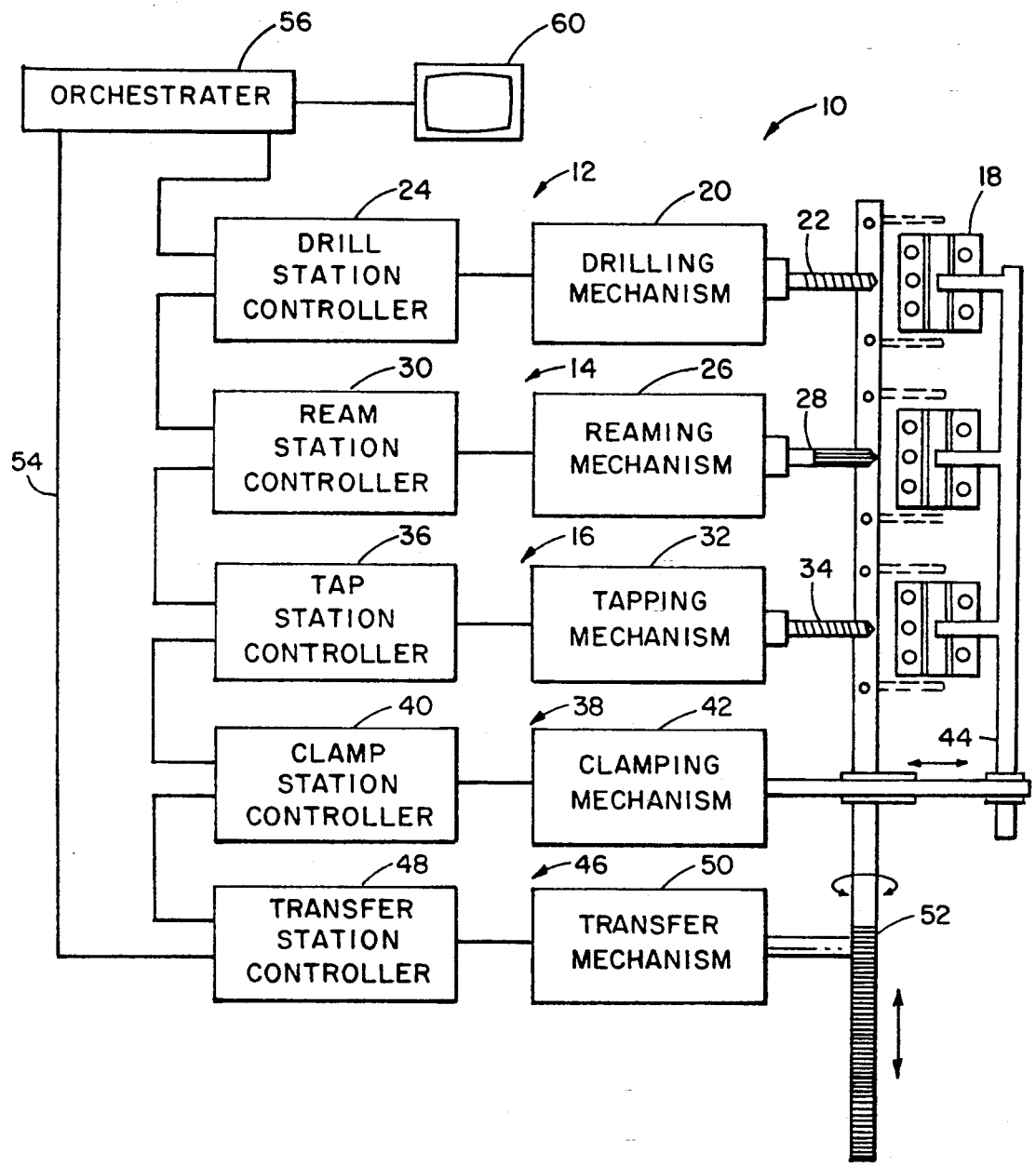
FIG. 1 is a functional block diagram of a machine control system embodying the present invention.

FIG. 1 illustrates a machine control system 10 in accordance with an exemplary embodiment of the invention as comprising a series of work stations 12, 14, 16 for sequentially performing operations on a continuing series of workpieces 18 such as engine blocks. Work station 12 in the exemplary embodiment of FIG. 1 comprises a drilling station which includes a drilling mechanism 20 coupled to bit 22 for drilling a hole at a preselected location in a workpiece 18 and controlled by a drill station controller 24. Likewise, work station 14 (FIGS. 1 and 2) comprises a reaming station which includes a reaming mechanism 26 with a bit 28 for reaming the hole drilled at station 22, and a ream station controller 30 coupled to mechanism 26. Work station 16 includes a tapping mechanism 32 having a bit 34 for tapping the hole drilled at station 12 and reamed at station 14, and a controller 36 coupled to tapping mechanism 32. Station controllers 24, 30, 36, 40 and 48 are serially connected in a communication loop 54 with an orchestrator computer 56 for controlling operation among the various work stations. Orchestrator 56 is coupled to a display 58 for indicating status, including system error messages, to an operator.

System 10 further includes a clamping station 38 with a controller 40 coupled through a clamping mechanism 42 to a clamping bar 44 or the like for selectively clamping workpieces 18 at stations 12–16, or for unclamping the workpieces for transfer between sequential stations. A transfer station 46 includes a transfer station controller 48 coupled through a transfer mechanism 50 to a bar 52 for selectively engaging workpieces 18 with clamp 44 retracted and moving workpieces 18 between stations 12, 14, 16 in sequence. It will be appreciated, of course, that system 10 illustrated in FIG. 1 is a simplified example of an automated machine system which may include several dozen work stations and a multiplicity of clamping and transferring stations for automated operation on workpieces 18. In this simplified example, there are at least five separately controllable mechanisms—i.e., the slides on which the drill, ream and tap motors are mounted, and the clamping and transfer actuators. It will be understood, however, that each station may include a plurality of controllable mechanisms, which may be coded and operated in the manner to be described without departing from the scope of the invention. Indeed, such expendability is an important advantage of the invention.

Figure 2:
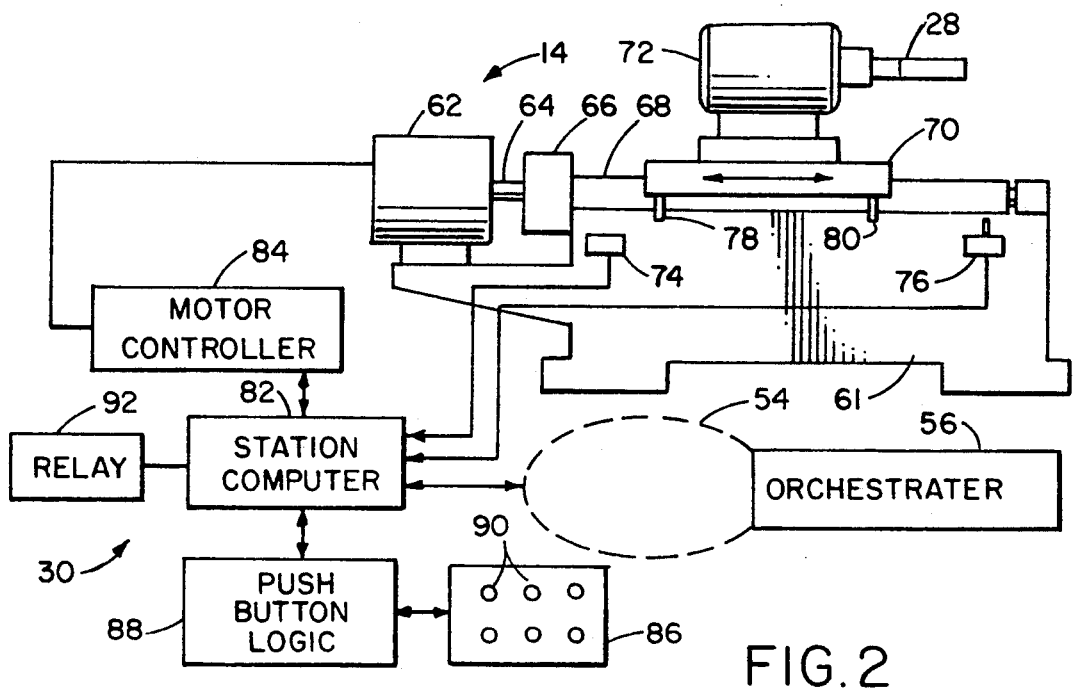
FIG. 2 is a more detailed functional block diagram of the reaming work station in FIG. 1.

FIG. 2 illustrates reaming work station 14 as comprising a base 61 having a reversible electric motor 62 mounted thereon. Motor 62 has an output shaft 64 coupled through a gear transmission 66 to a worm shaft 68. A machine slide 70 is slidably mounted on base 60 in engagement with worm shaft 68. A ream head 72 rotates ream bit 22 for reaming a pre-drilled hole at a predetermined position in workpiece 18 (FIG. 1). Limit switches 74, 76 are positioned on base 61, and fingers 78, 80 on slide 70 engage limit switches 74, 76 at the extreme limits of travel of the machine slide. Limit switches 74, 76 are connected to the station computer 82 of ream station controller 30. Motor 62 is powered by a motor controller 84 which provides a feedback signal to computer 82 indicative of motor operation. Controller 84 is coupled to station computer 82. Computer 82 is also connected by communications loop 54 to orchestrator 56 (FIG. 1).

The general operation of reaming station 14 requires that slide 70 move off of returned limit switch 74 by energizing motor 62 to rotate lead screw 68 and move slide 70 forward until finger 80 engages advanced limit switch 76. At this point, motor 62 must be stopped and re-energized to rotate lead screw 68 in the opposite direction for reversing the direction of travel of machine slide 70 until finger 78 engages limit switch 74. A control panel 86 is connected to station computer 82 through logic circuitry 88 and includes pushbuttons 90 which indicate functions such as "start ream motor", "advance slide", "single step", "stop ream motor", "return slide", "automatic" and "manual". A watchdog relay 92 is connected to station computer 82 to shutdown station 14 if an error is detected.

Figure 3:
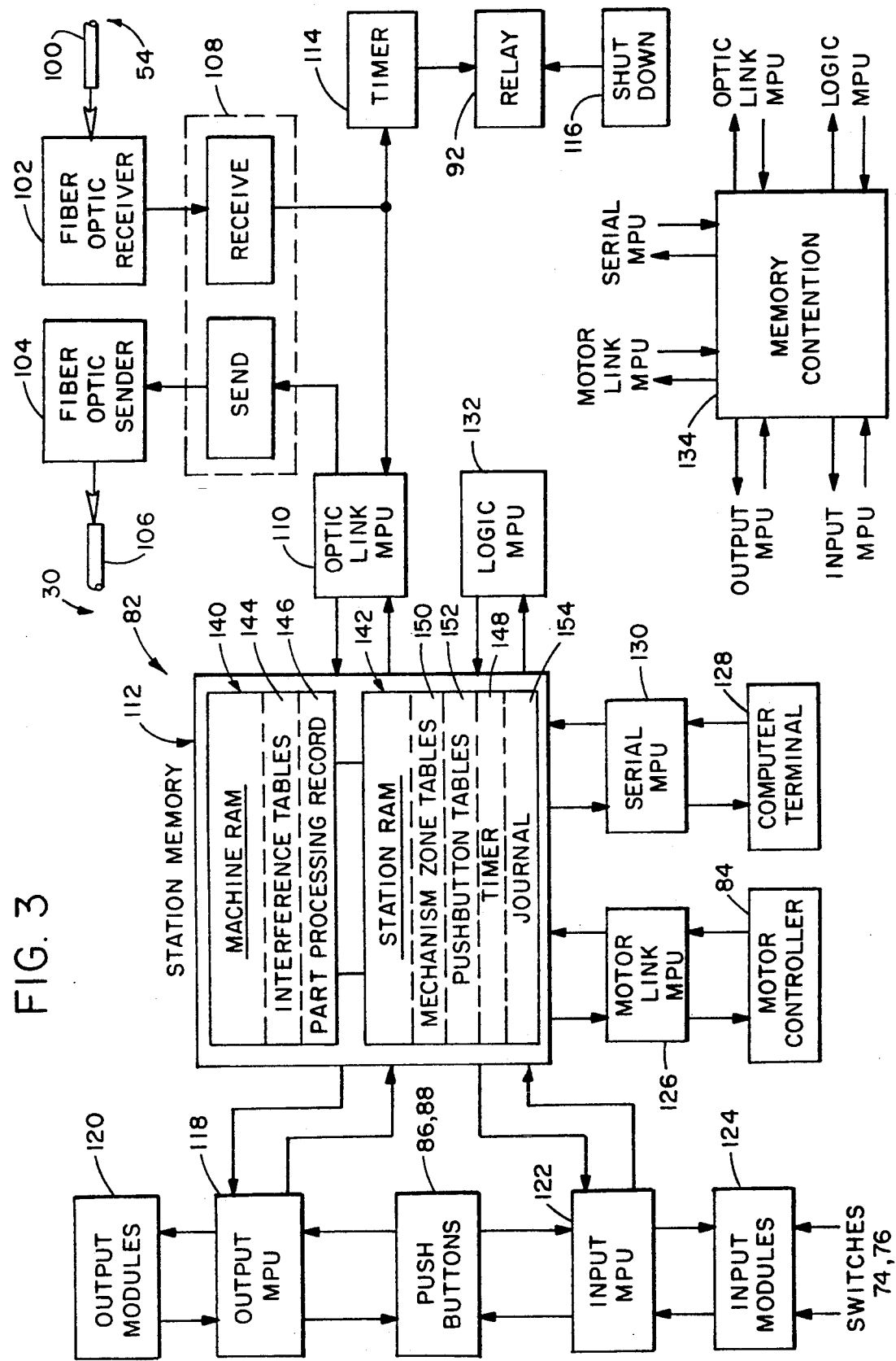
FIG. 3 is a functional block diagram of the reaming station controller in FIGS. 1 and 2.

FIG. 3 is a functional block diagram of ream station controller 30, including ream station computer 82 (FIGS. 1 and 2). Communications loop 54, which preferably comprises an optical communications loop, includes a fiber-optic cable 100 coupled to a fiber-optic receiver 102 in station computer 82 (FIGS. 1–3) for receiving signals from the upstream controller, in this case drill station controller 24, and a fiber-optic transmitter 104 coupled by a fiber-optic cable 106 in loop 54 to the downstream controller, in this case tap station controller 36. (The order of interconnection of loop 54 among controllers 24, 30, 36, 40 and 48 is irrelevant). Transmitter 104 and receiver 102 are coupled through an isolator 108 to an optical link microprocessor unit or MPU 110. MPU 110 interferes with a memory 112. Input information is stored in memory 112, and may be recalled and processed as desired. The receiver electronics are also coupled to a watchdog timer 114 which is connected to relay 92 (FIGS. 2 and 3) for terminating station operation in the event of a loss of signal on the receiver line. Relay 92 is also responsive to other suitable shutdown electronics 116.

Memory 112 is a public memory that is available to the several MPUs which comprise station computer 82. An output MPU 118 communicates with memory 112 and output modules 120 for connection of output signals to external devices. Output MPU 118 also provides signals to pushbutton logic 88 and operator pushbutton panel 86 (FIGS. 1 and 3). An input MPU 122 receives signals from input modules 124, which are connected to station input devices such as switches 74, 76 in FIG. 2. A motor link MPU couples memory 112 to motor controller 84 (FIGS. 2 and 3). An operator computer terminal 128 is coupled to memory 112 through the serial MPU 130. A logic MPU 132 communicates with memory 112 and executes a prestored operating system for controlling overall station operation. Since several MPUs have access to public memory 112, it is necessary to organize memory access. This is accomplished by the memory contention module 134, which preferably comprises a programmable logic array chip programmed in conventional fashion.

Drill station 12, tapping station 16, clamping station 38 and transfer station 46, and particularly the various station controllers 24, 36, 40 and 48, are preferably structurally similar to ream station 14 hereinabove described in detail in connection with FIGS. 2 and 3, the only difference being in the mechanism for performing work on the workpieces and in the prestored station operation system programs. Structure and operation of controllers 24, 30, 36, 40, 48 and 56 are as disclosed in greater detail in U.S. Pat. No. 4,621,200. Reference is made to such patent for a more detailed discussion of structure of the station controllers.

As illustrated in FIG. 3, memory 112 includes a section 140 of machine RAM in which identical information is stored for all controllers 24, 30, 36, 40 and 48 (FIG. 1), and a section 142 of memory dedicated specifically to that station—e.g., ream station 14. In general, machine RAM 140 is managed by orchestrator 56 (FIGS. 1 and 2) and contains information needed by all station controllers—e.g., station interference tables 144 and part processing record 146. Station RAM 142 is controlled by the station controller and contains information specific to the station in question—e.g., a time-in-zone memory 148, station mechanism zone tables 150, pushbutton logic tables 152 and a station journal 154. The various MPUs of controller 30 (in FIG. 3) can read all data in machine RAM 140, but can vary or update only data associated with station 14. The same is true, of course, for the other station controllers.

Station controllers 24, 30, 36, 40 and 48 are serially connected with orchestrator 56 in a closed communications loop as hereinabove noted, specifically a serial communications loop. Information is continually but separately received and transmitted around the loop by each station computer MPU 110 (FIG. 3). This information is a time division multiplex of command signals from the orchestrator to the various station computers, status information from the work station computers to the orchestrator, and miscellaneous data information including update of part processing records 146. The command, status and data information is contained in a continual series of individual information packets, specifically time division multiplexed digital information packets. Time division multiplexed closed-loop communication among the work station and orchestrator computers as hereinabove described is the subject of copending application Ser. No. 757,225 filed Jul. 19, 1985, to which reference is made for details of implementation.

Figure 4A:
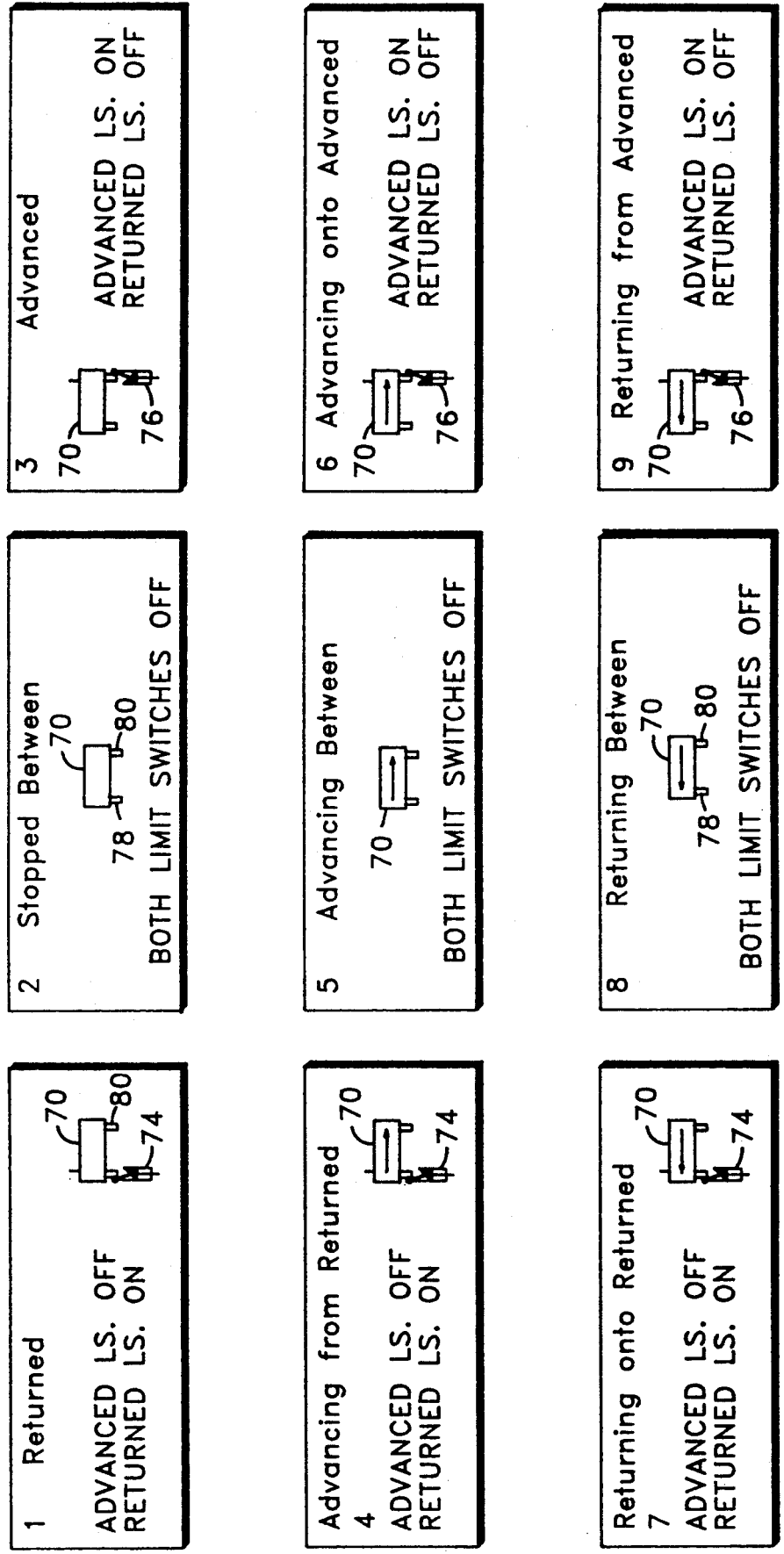
FIG. 4A is a pictorial illustration of valid operating states or zones of the ream slide mechanism of FIG. 2.

FIG. 4A illustrates valid zones of operation of reaming mechanism 26, and FIG. 4B is a zone table or chart listing the valid zones by name with corresponding I/O images. In zone 1, the ream slide 70 is RETURNED, the advanced limit switch 76 is turned off, the returned limit switch 74 is turned on and both advance and return power to motor 62 are turned off. In zone 2, drill slide 70 is STOPPED BETWEEN the advanced and return limit switches, so that both limit switches are turned off or provide a zero output, and neither advance nor return power is applied to the slide motor. In zone 3, the slide 70 is ADVANCED onto advanced limit switch 76, switch 76 is turned on, switch 74 is turned off, and all power is turned off. In zone 4, slide 70 is ADVANCING FROM RETURNED such that returned limit switch 74 is on, advanced limit switch 76 is off and advance power is applied to slide motor 62. In zone 5, slide 70 is ADVANCING BETWEEN the limit switches, both limit switches being turned off and advance power still being applied. In zone 6, slide 70 is ADVANCING ONTO ADVANCED limit switch 76, with advance power still applied but advanced limit switch 76 turned on. Zones 7, 8 and 9 named RETURNING ONTO RETURNED, RETURNING BETWEEN and RETURNING FROM ADVANCED are similar to zones 4, 5 and 6 except that return power rather than advance power is turned on.

Thus, it will be seen that FIGS. 4A and 4B represent nine valid zones which reflect all of the physically possible operative conditions of the physical mechanism. The total number of possible zones is equal to the number of states per I/O raised to the power of the number of available I/O conditions. Thus, in this example, each I/O has two possible states, and there are a total of four I/Os available, presenting sixteen total possible zones, including seven invalid zones. For example, there are three possible invalid zones in which both advanced limit switch 76 and returned limit switch 74 are turned on, three possible invalid zones in which both advance motion power and return motion power are turned on, and the seventh invalid zone in which all I/Os are turned on. However, in accordance with an important feature of the present invention, it is not necessary to define all invalid zones. Rather, only valid zones need be defined, and all invalid zones are grouped into a single ERROR zone, zone 10 in FIG. 4B, in which both advance and return power are turned off and an error message is presented at display 60 (FIG.1). As will be described in detail hereinafter, and in accordance with yet another important feature of the present invention, such display message provides a verbal indication which combines zone names and I/O names in such a way that a complete description of the error condition is provided based upon the last valid zone in which the mechanism was operating prior to entry into the ERROR zone. The coded zone table of FIG. 4B, along with tables corresponding to any other mechanisms at station 14, are stored in station RAM memory section 150 (FIG. 3).

Figure 5:
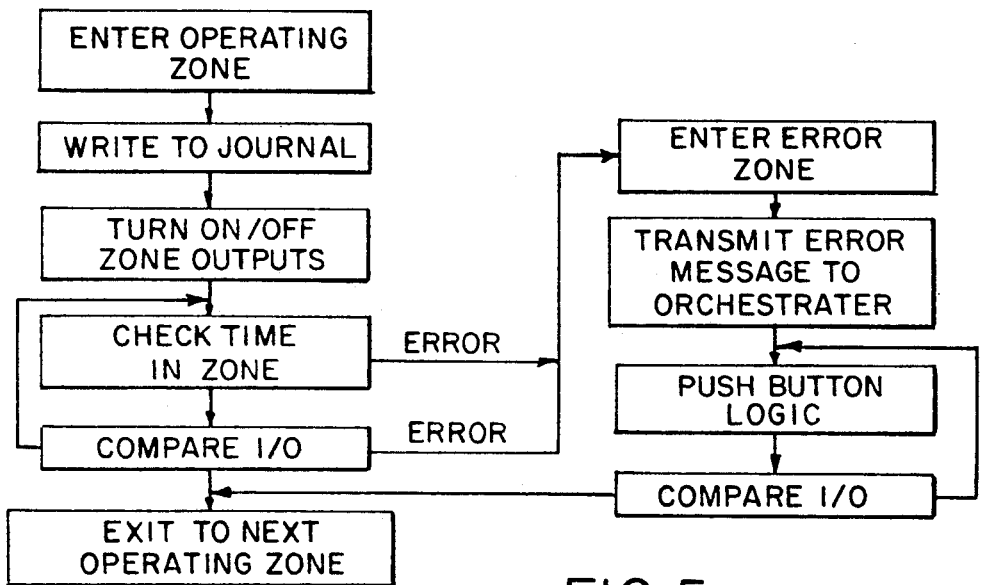
FIG. 5 is a flow chart illustrating operation of zone engine logic.

FIG. 5 illustrates operation of zone engine processing within logic MPU 132 in FIG. 3. Upon entry into a valid operating zone—i.e., a zone for which I/O has been defined and tabulated in the manner illustrated in FIG. 4B and stored within mechanism zone table memory section 150 in FIG. 3—an appropriate entry is written to journal memory section 154, whereby station memory contains a record of station operation. Journal 148 may comprise a "flight recorder" type of memory in which only a preselected number of previous zone entries are retained for purposes of analysis as required upon occurrence of an error condition. Following entry to journal 154, the appropriate zone outputs are turned on or off. For example, if the mechanism enters zone 1 from zone 7 (FIG. 4B), power to slide motor 62 (FIG. 2) must be turned off. Timer memory section 148 is then checked to determine the amount of time spent in the previous zone, in this case the amount of time spent in zone 7 following entry thereto from zone 8. Each zone has an associated predetermined maximum time-in-zone which, if exceeded, indicates an error condition. Next, the I/O image is compared to that expected and, failing recognition of the expected I/O image, operation is transferred to the ERROR zone. Note that there is a delay between energization or de-energization of the zone outputs and comparison with I/O image in order to allow the output signals to assume the desired level. Operation then cycles through timer check and I/O comparison until a change in the I/O image causing exit to the next operating zone or exit to the ERROR zone.

This cycle is repeated continuously and operation transferred from zone to zone in sequence unless transferred to the ERROR zone or otherwise halted, such as by manual termination of automatic cycle operation.

Upon entry to the ERROR zone (FIG. 5), an error message is transmitted to orchestrator 56 for generation of an error message (as will be described in greater detail in connection with FIGS. 8 and 9). Such error message includes station and mechanism names, the last valid zone in which the station operated (taken from journal 154 in FIG. 2), and the condition which caused the error indication—i.e., unexpected change in input or exceeding maximum time-in-zone. Pushbutton logic 88 (FIG. 2) is operative to permit manual correction of the error condition. When the I/O image indicates correction of the error and return to autocycle, operation returns to the next valid zone—i.e., the next operating zone indicated by I/O image.

Figures 6A, 6B:
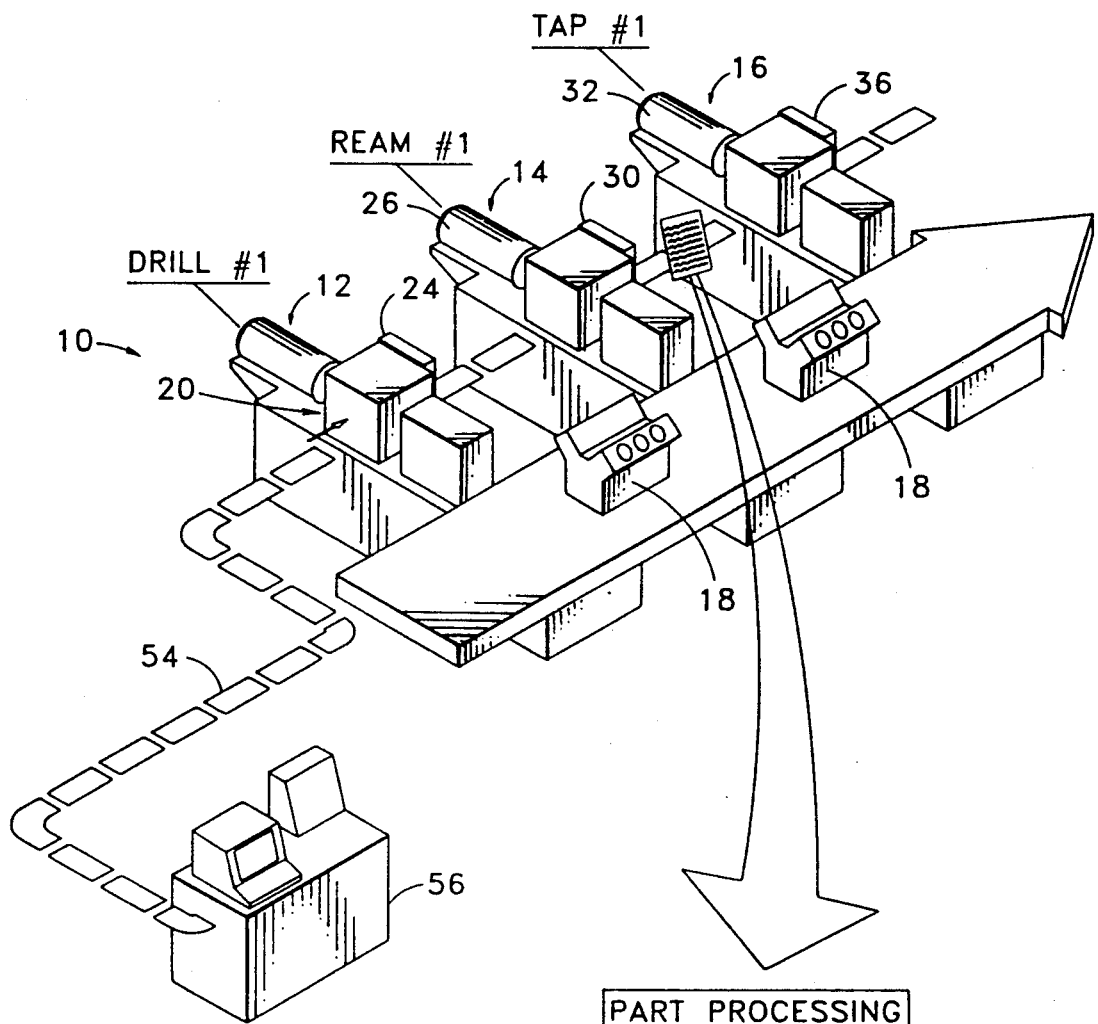
FIGS. 6a and 6b are schematic diagrams illustrating transmission of part history indicia between work station controllers.

FIG. 6 schematically illustrates an important feature of the present invention. That is, information is effectively transmitted between operating stations so that each station is effectively aware of the part processing history or record of a workpiece arriving at that station. Thus, for example, tapping mechanism 32 at station 16 will not attempt to tap a hole which has not been drilled at station 12 and reamed at station 14. This feature of the invention not only prevents damage to the tapping bit at station 16 (which would eventually result in shutdown of the line because the tapping slide mechanism would remain too long in corresponding zone 5), but also permits restart of the line without manual inspection of all parts in the line and corresponding reset of the various stations. The processing records of all parts on the line are stored in memory section 146 (FIG. 3) at each station controller. The part process inhibit feature will be discussed in greater detail in connection with FIG. 7.

In accordance with another important feature of the invention, pushbutton logic 88 in ream station controller 30 (FIG. 2, as well as corresponding pushbutton logic in the other controllers) operates lighted pushbuttons 90 on panel 86 in such a way as to advise an operator of operating status and/or availability for operation at the associated mechanism. More specifically, a pushbutton lamp flashes slowly to indicate that the action associated with that pushbutton will be implemented if the pushbutton is pressed. The lamp flashes rapidly to indicate that the associated action is currently being implemented, either automatically or through manual depression of the button as previously described. The lamp remains steadily lit to indicate that the associated action has been completed, again either manually or in the automatic mode of operation. An unlighted lamp indicates that the action association with this pushbutton will not be implemented even if the pushbutton is depressed.

Figure 7B:
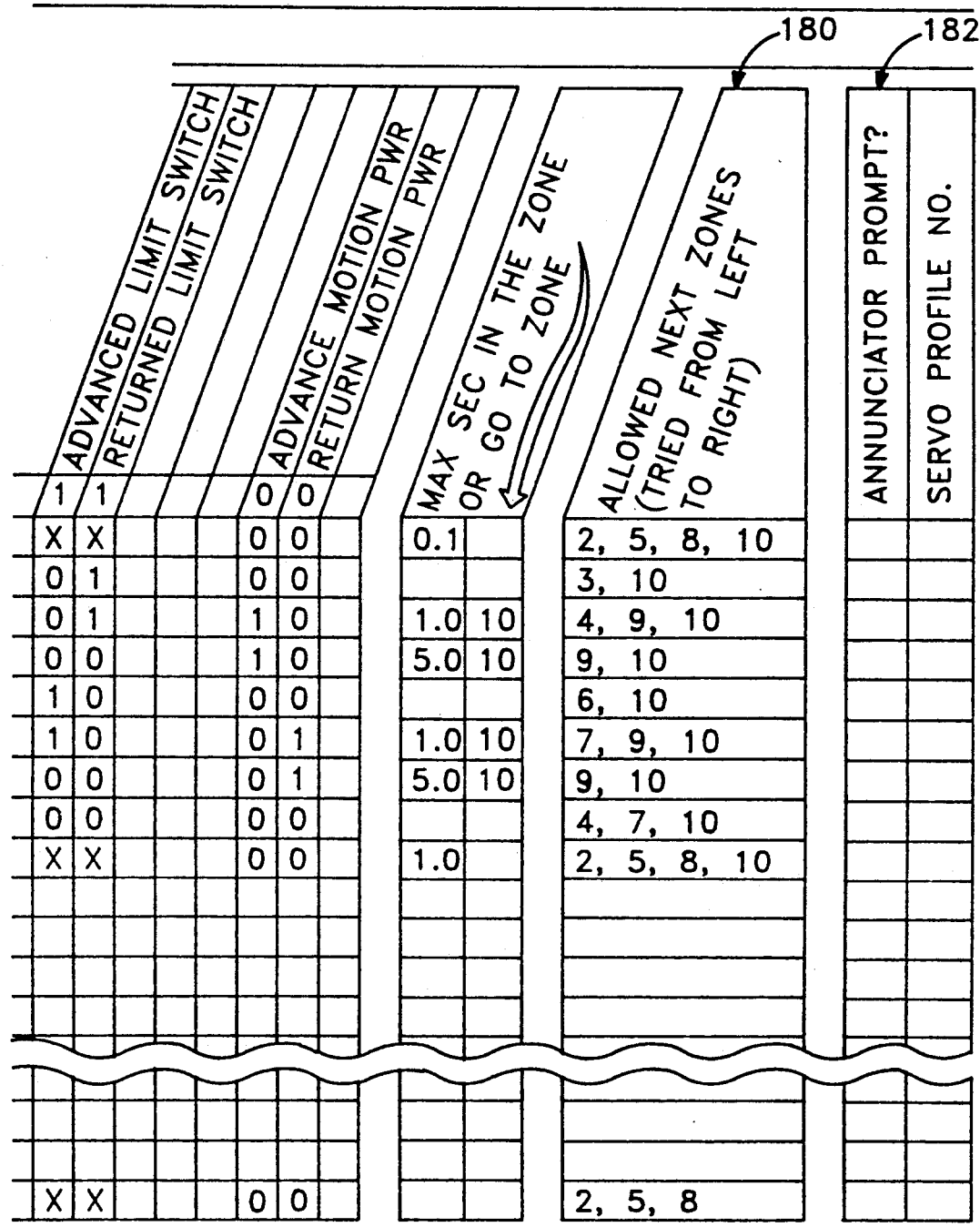
Figure 7C:
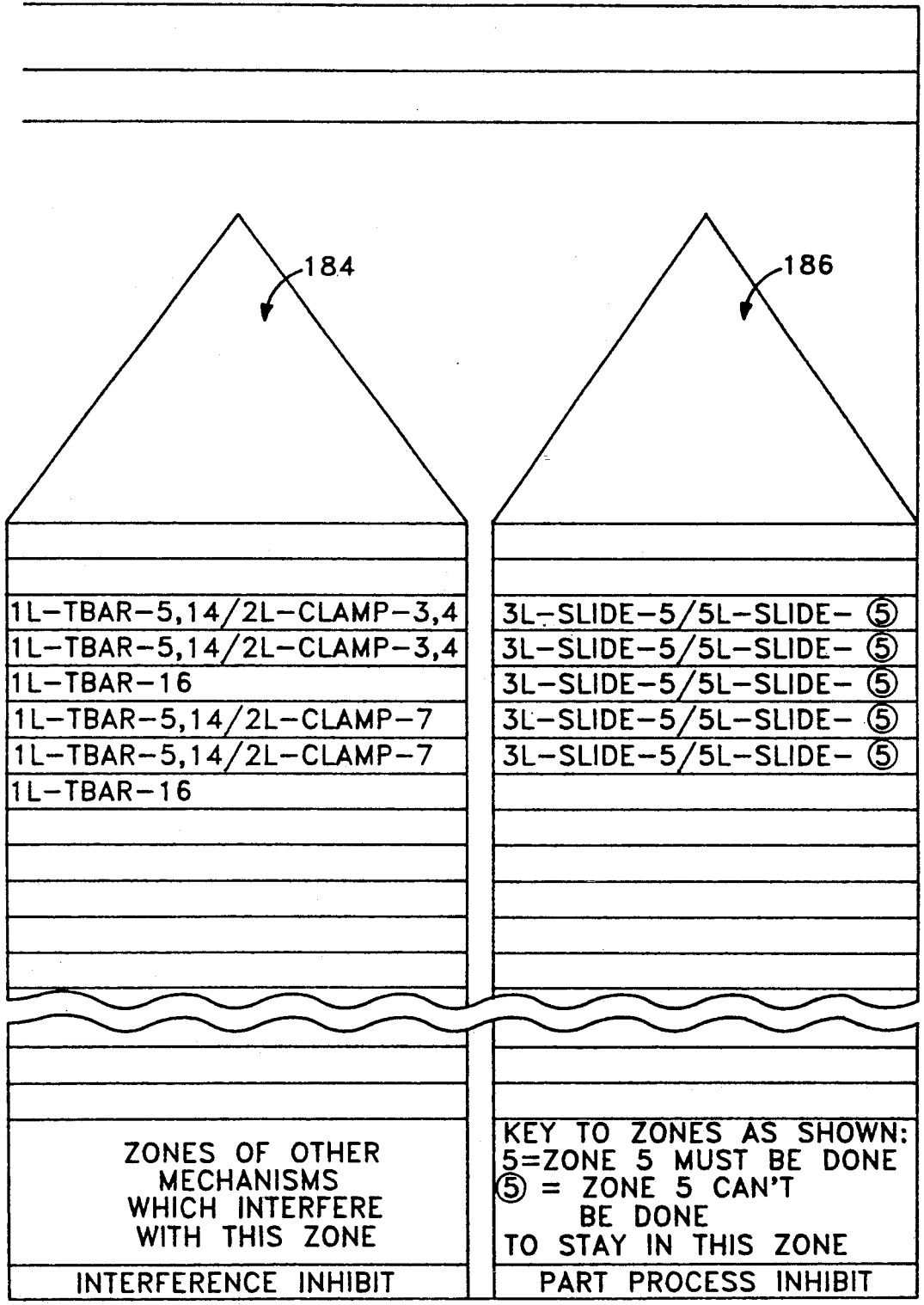

FIG. 7 illustrates a complete zone table for a ream slide mechanism in a working embodiment of the invention. The zones identified by name in the table of FIG. 7 differ from those identified in FIG. 4B in two respects. First of all, zones 6 and 7 in FIG. 4B, named ADVANCING ONTO ADVANCED and RETURNING ONTO RETURNED have been deleted. Secondly, these zones have been replaced by an INITIALIZING zone, zone 1 in FIG. 7, and by a COASTING TO STOP zone, zone 9 in FIG. 7. The INITIALIZING zone is necessary to provide a starting point upon initialization of the mechanism and associated controller. The zone table of FIG. 7 also includes command inputs as well as physical inputs from the limit switches, a column 180 of maximum times in zone where appropriate for each zone, a column 182 of allowable next zones, and a pair of inhibit columns 184,186 for each zone as a function of potential interference with other zones in the overall system (column 184) and the part processing record inhibit previously discussed (column 186). The table of FIG. 7 is for operation of the MECHANICAL SLIDE (70 in FIG. 2) at the ream station, which is given the station name 5L. The mechanism at transfer station is called TBAR and the transfer station is named 1L, and the CLAMP mechanism is at station named 2L. The drill station (12 in FIG. 1) is named 3L.

When INITIALIZING, all inputs are initially ignored, motion power outputs are set to zero and, after a delay of 0.1 second (column 180), the physical or limit switch inputs are tested for an image corresponding to zones 2, 5 and 8 in that order (column 182). That is, upon initialization, the physical mechanism must be either RETURNED per zone 2, ADVANCED per zone 5 or STOPPED BETWEEN the RETURNED and ADVANCED positions per zone 8. If the physical inputs from the limit switches do not correspond to any of these zones, the zone engine (FIG. 5) automatically transfers to ERROR zone 10, and a corresponding error message is indicated at display 60 as will be described in detail in connection with FIGS. 8-9. Assuming that the slide is RETURNED upon initialization, operation transfers to zone 2 and awaits receipt of an ADVANCE SLIDE command. Note that there is no maximum time (column 180) in zone 2, and that the only allowable next zones (column 182) are zone 3, which is entered upon receipt of an ADVANCE SLIDE command, and ERROR zone 10 which is entered upon any other I/O change. Upon receipt of the ADVANCE SLIDE command, operation transfers to zone 3 in which advance motion power is applied to the slide motor unless inhibited by a transfer inhibit or a part process inhibit. In interference inhibit column 184, application of advance motion power is inhibited if the transfer mechanism TBAR at transfer station 1L is in zone 5 or 14 of that mechanism (in which transfer is taking place). Manifestly, the ream slide should not be advanced onto the workpiece if transfer is in process. Likewise, application of advance motion power is inhibited if the CLAMP mechanism at station 2L is in zone 3 or 4—i.e., when the clamp mechanism would physically interfere with reaming of the workpiece. In the part process inhibit column 186, application of advance motion power is inhibited if the SLIDE mechanism at drilling station 3L has not achieved zone 5 of that mechanism (which, because it is a MECHANICAL SLIDE, corresponds to zone 5 of FIG. 7). That is, advancement of the reaming mechanism is inhibited unless the part processing record in machine RAM section 146, which is updated after each machine cycle, indicates that the drill SLIDE mechanism at drilling station 3L (12 in FIG. 1) has already been ADVANCED against the part now present at the reaming station. Likewise, application of advance motion power is inhibited if the SLIDE mechanism at station 5L, which is the reaming station, has already achieved zone 5 on this part—i.e., has already reamed its hole. The maximum time in zone 3 is one second, which is to say that if more than one second is required to leave returned limit switch 78 (FIG. 2) operation transfers to ERROR zone 10. Operation can transfer to ADVANCING BETWEEN zone 4, COASTING TO STOP zone 9 or ERROR zone 10.

Operation then proceeds through the various zones with maximum times in zone, allowed next zones, interference inhibits and part process inhibits as illustrated in FIG. 7. The interference inhibit and part process inhibit columns of the zone table of FIG. 7 may be completed by the system designer or, more preferably, completed by computer during a system coding process based upon information supplied by the system designer in establishing operation of other system zones.

Figure 8:
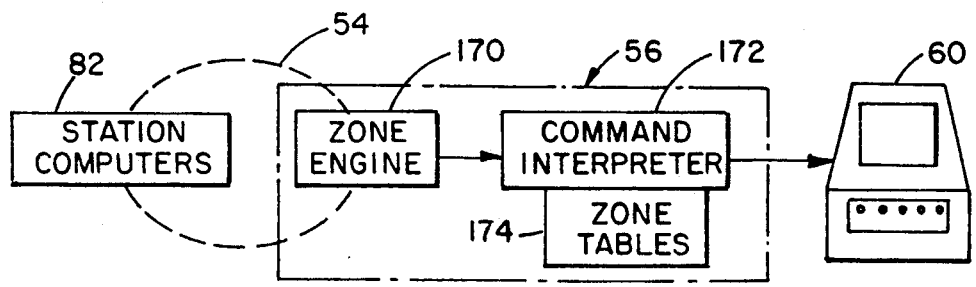
FIG. 8 illustrates a more complete mechanism zone table for the ream slide mechanism of FIGS. 1 and 2.

FIG. 8 is a schematic diagram which illustrates that portion of orchestrator controller 56 (FIGS. 1 and 2) which relates to generation of error messages at display 60. Station computers 82 (FIG. 2) communicate with orchestrator 56 through communication loop 54. As noted above, details of such communication are disclosed in copending U.S. application Ser. No. 757,225 filed Jul. 19, 1985. Error message generation within orchestrator 56 is programmed as what might be termed a "pseudomechanism," which is to say that error message generation is programmed as if it were a physical mechanism, such as the mechanical slide hereinabove discussed in detail. A zone engine 170 similar to that in FIG. 5 receives the error signals from the station computers. A command interpreter 172 accesses zone tables 174, which include zone tables of the type in FIG. 7 for all stations, zones and pseudozones. From such zone tables, the error message is composed as a function of the error message signals and supplied to display 60.

Figure 9B:
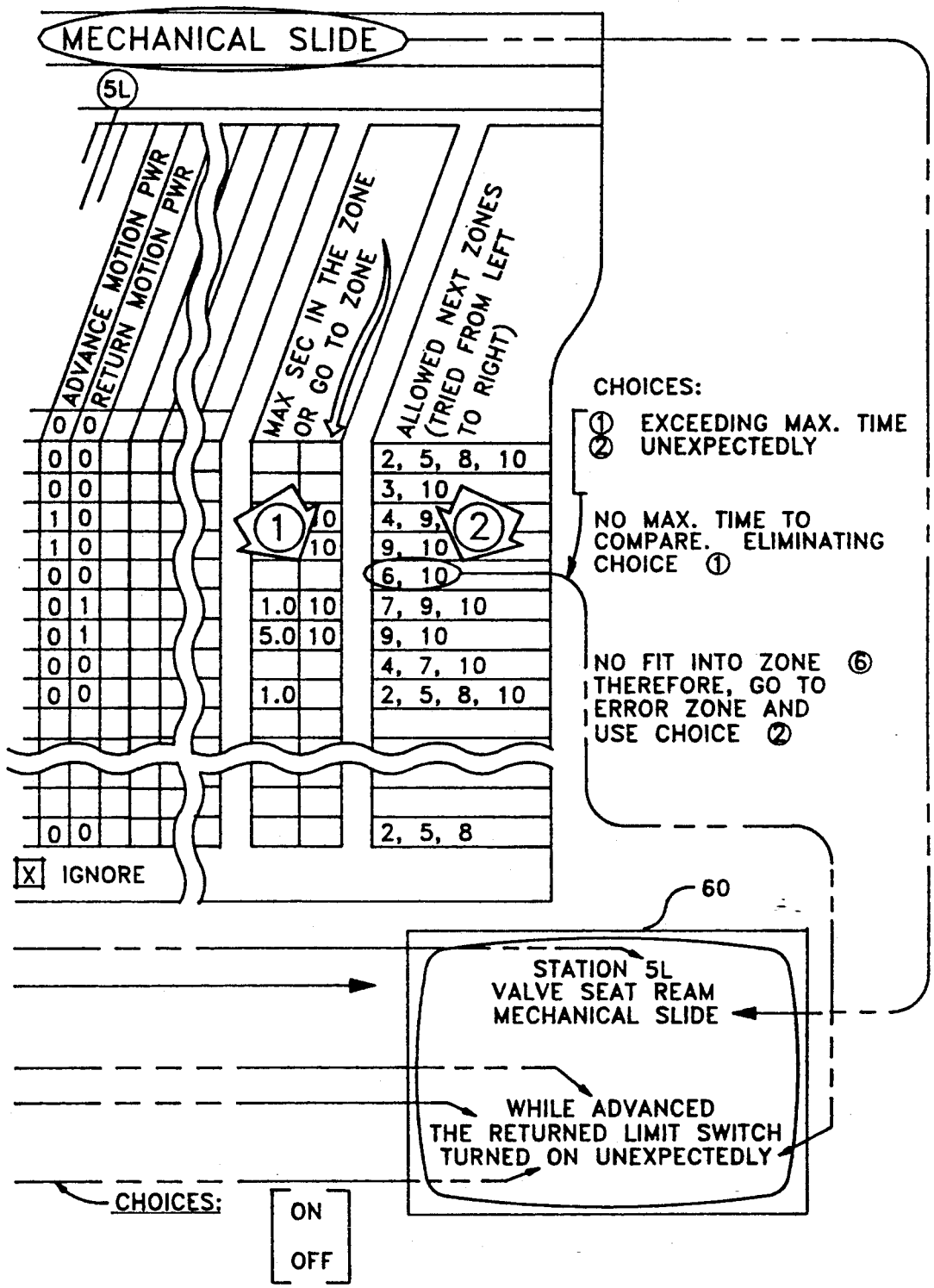

FIG. 9 illustrates error message generation for a particular type of error—i.e., one in which returned limit switch 74 turned on while MECHANICAL SLIDE mechanism 70 at reaming station 5L was in the ADVANCED zone—i.e., zone 3 in FIGS. 4A and 4B or zone 5 in FIG. 7. Through access to tables 174, command interpreter 172 (FIG. 8) automatically displays station name "STATION 5L," a verbal description of station function "VALVE SEAT REAM," and the name of the failed mechanism "MECHANICAL SLIDE." The message continues with the preprogrammed standard introductory word "WHILE" followed by the name of the zone in which the mechanism was operating prior to entry into the error zone—i.e., the zone name "ADVANCED." The message continues with the preprogrammed article "THE" followed by the name of the physical I/O which apparently failed—i.e., "RETURNED LIMIT SWITCH." The message continues with the preprogrammed word "TURNED" followed by "ON" or "OFF" depending upon the state to which the switch changed to create the error—in this case "ON." Finally, since the returned limit switch was not expected to turn on during operation in this zone, the message includes the word "UNEXPECTEDLY." Thus, the total message indicates that at "STATION 5L VALVE SEAT REAM MECHANICAL SLIDE" an error condition arose in which "WHILE ADVANCED THE RETURNED LIMIT SWITCH TURNED ON UNEXPECTEDLY."

In addition to a change in physical I/O image, an error can occur if the mechanism remains in a zone for a time greater than the corresponding maximum time-in-zone. For example, the slide may remain in RETURNING BETWEEN zone 7 for a time greater than the maximum time of five seconds. In this case, the error message at display 60 would read "STATION 5L VALVE SEAT REAM MECHANICAL SLIDE WHILE RETURNING BETWEEN EXCEEDED MAXIMUM TIME." Thus, command interpreter 172 (FIG. 8) and preprogrammed zone table 174 together comprise an error message composer which automatically associates predefined text with error messages received from the station computers. It will be noted in particular that this feature of the invention coordinates with the use of predefined zone logic as hereinabove described since examination of the zone name, mechanism name, zone image and unexpected event effectively defines the error message. The system thus presents the diagnosis of the problem in a standard language readily understood by humans. The operator immediately identifies the fault without further thought or interpretation of logic sequences of relay contacts or the like. It will be appreciated that the error messages themselves are not preprogrammed, only individual message segments associated with specific conditions. Thus, the designer need not consider all possible combinations of errors. Indeed, for the MECHANICAL SLIDE mechanism of FIG. 9, the total number of possible error messages is equal to the number of zone names (nine) multiplied by the number of I/O names (four) multiplied by the number of possible I/O states (two) multiplied by the number of terminations ("EXCEEDING MAX TIME" or "UNEXPECTEDLY"—i.e., two). Thus, one hundred forty-four possible error messages are composable without explicit extra programming relating to each message individually.

Coding of a complete system involves a number of stages. First of all, a part process is defined as a function of operations to be performed on the workpieces. In the example of FIG. 1 hereinabove discussed in detail, five physical operations are performed—i.e., drilling, reaming, tapping, clamping and transfer. Thus, as a second step, the definitions of each station machine follows from the process definition, and in turn leads to definition of the physical mechanism or mechanisms at each location. As hereinabove noted, mechanism is a device which provides a single motion and cannot interfere with itself. In the example discussed each station includes a single mechanism. However, there is no constraint on the number of mechanisms at a station. For example, the ream motor could be operated as a separate mechanism, and the collective clamp mechanism can be replaced by a separate clamp mechanism at each station. Regardless of the number of mechanisms in the system, implementation proceeds exactly as described herein. In addition, as noted above, there are a number of pseudomechanisms that must be defined which do not relate to a particular physical mechanism but which are needed to operate the overall system. Such pseudomechanisms may include initialization, auto cycling and/or error message generation.

Following identification of mechanisms, the system designer must define the allowable or valid zones for each mechanism along lines previously discussed in connection with FIGS. 4A and 4B, and also define mechanism-to-mechanism interferences among the various mechanisms within a single station and among the various stations. For example, none of the slides in the system of FIG. 1 can be advanced while the transfer mechanism 50 is operating or until the clamp bar 44 is in the clamped position. Similarly, the clamp bar 44 cannot be brought into clamped position while the transfer mechanism 50 is operating, and conversely the transfer mechanism cannot be operated until the clamp bar is rotated out of clamping position. These and other mechanism-to-mechanism interferences are defined by the system designer and placed either directly or, more preferably, by computer into the complete zone table for each system mechanism as illustrated in FIG. 7. Likewise, part process inhibit data is compiled by the system designer and placed in the zone table for each operating mechanism, either directly or by computer, as illustrated in and hereinabove discussed in connection with FIG. 7.

It will be noted that, although the system coding process described above can be a time consuming operation, control coding follows inherently and logically from overall system design and requirements. Furthermore, the system design process is, in essence, a constraint design process rather than an enablement design process. Two benefits result. First, since system operation is constraint limited, the system is permitted to operate to its maximum capacity without requiring the system designer actually to determine maximum system capacity. Secondly, the system designer is not required to anticipate all possible situations of system operation.

An appendix to this application includes a complete software listing for operation of the exemplary mechanical slide mechanism hereinabove discussed in detail for implementing pushbutton logic 88 (FIG. 2) as described and for generation of the error messages as illustrated in FIG. 9

MECHANICAL SLIDE MEMORY DATA

```
                    .cksm start
                    .orgn $MEC1
0100 0000           .indx M1CD
0102 0000           .indx SM1MD
0104 0000           .indx M1ID
0106 0000           .indx SM1LD
0108 0000           .byte 0000
010A 0214           .indx M1CK
010C 0000           .indx SM1ZC
010E 0000           .byte 0000
0110 000A           .byte 000A
0112 0154           .indx M101
0114 0157           .indx M1I1
0116 015F           .indx M1E1
0118 0168           .indx M102
011A 016B           .indx M1I2
011C 0173           .indx M1E2
011E 017C           .indx M103
0120 017F           .indx M1I3
0122 0187           .indx M1E3
0124 0190           .indx M104
0126 0193           .indx M1I4
0128 019B           .indx M1E4
012A 01A4           .indx M105
012C 01A7           .indx M1I5
012E 01AF           .indx M1E5
0130 01B8           .indx M106
0132 01BB           .indx M1I6
0134 01C3           .indx M1E6
0136 01CC           .indx M107
0138 01CF           .indx M1I7
013A 01D7           .indx M1E7
013C 01E0           .indx M108
013E 01E3           .indx M1I8
0140 01EB           .indx M1E8
0142 01F4           .indx M109
0144 01F7           .indx M1I9
0146 01FF           .indx M1E9
0148 0208           .indx M1010
014A 020B           .indx M1I10
014C 0213           .indx M1E10

014E  01   M10S:    .byte 01
014F  00            .byte 00

0150  01   M1IS:    .byte 01
0151 0000           .byte 000000

0154 014E  M101:    .indx M10S
0156  00            .byte 00
0157 0150  M1I1:    .indx M1IS
0159 0000           .byte 0000
015B FFFF           .byte FFFF
015D C040           .byte C040
015F 0504  M1E1:    .byte 0504FE00
```

```
0163 030A         .byte 030AFFFF
0167  00          .byte 00

0168 014E M1D2:   .indx M1DS
016A  00          .byte 00
016B 0150 M1I2:   .indx M1IS
016D 0000         .byte 0000
016F FFFF         .byte FFFF
0171 C000         .byte C000
0173 0505 M1E2:   .byte 0505FE00
0177 030A         .byte 030AFFFF
017B  00          .byte 00

017C 014E M1D3:   .indx M1DS
017E  00          .byte 00
017F 0150 M1I3:   .indx M1IS
0181 0000         .byte 0000
0183 FFFF         .byte FFFF
0185 C080         .byte C080
0187 0509 M1E3:   .byte 0509FE00
018B 030A         .byte 030AFFFF
018F  00          .byte 00

0190 014E M1D4:   .indx M1DS
0192  80          .byte 80
0193 0150 M1I4:   .indx M1IS
0195 0000         .byte 0000
0197 FFFF         .byte FFFF
0199 C040         .byte C040
019B 0505 M1E4:   .byte 05050140
019F 030A         .byte 030AFFFF
01A3  00          .byte 00

01A4 014E M1D5:   .indx M1DS
01A6  80          .byte 80
01A7 0150 M1I5:   .indx M1IS
01A9 0000         .byte 0000
01AB FFFF         .byte FFFF
01AD C000         .byte C000
01AF 0506 M1E5:   .byte 05060180
01B3 030A         .byte 030AFFFF
01B7  00          .byte 00

01B8 014E M1D6:   .indx M1DS
01BA  80          .byte 80
01BB 0150 M1I6:   .indx M1IS
01BD 0000         .byte 0000
01BF FFFF         .byte FFFF
01C1 C080         .byte C080
01C3 0503 M1E6:   .byte 0503FE00
01C7 030A         .byte 030AFFFF
01CB  00          .byte 00

01CC 014E M1D7:   .indx M1DS
01CE  40          .byte 40
01CF 0150 M1I7:   .indx M1IS
01D1 0000         .byte 0000
01D3 FFFF         .byte FFFF
01D5 C040         .byte C040
01D7 0501 M1E7:   .byte 0501FE00
01DB 030A         .byte 030AFFFF
01DF  00          .byte 00

01E0 014E M1D8:   .indx M1DS
01E2  40          .byte 40
01E3 0150 M1I8:   .indx M1IS
01E5 0000         .byte 0000
01E7 FFFF         .byte FFFF
01E9 C000         .byte C000
01EB 0507 M1E8:   .byte 05070140
01EF 030A         .byte 030AFFFF
01F3  00          .byte 00
```

```
01F4 014E M1O9:  .indx M1OS
01F6  40         .byte 40
01F7 0150 M1I9:  .indx M1IS
01F9 0000        .byte 0000
01FB FFFF        .byte FFFF
01FD C080        .byte C080
01FF 0508 M1E9:  .byte 05080180
0203 030A        .byte 030AFFFF
0207  00         .byte 00

0208 014E M1O10: .indx M1OS
020A  00         .byte 00
020B 0150 M1I10: .indx M1IS
020D 0000        .byte 0000
020F FFFF        .byte FFFF
0211 0000        .byte 0000
0213  00 M1E10:  .byte 00

0214 50D9 M1CK:  .cksm write
         Smeclend:
```

KNRN 3F0005010023000000000000000000002140000000000A01540157015F016801680173017C017F01
KNRN 3F0005012323870190019301980 1A401A701AF01B801BB01C301CC01CF01D701E001E301EB01F401F7
KNRN 3F000501462301FF02080208021301000100000014E0001500000FFFFC0400504FE00030AFFFF0001
KNRN 3F00050169234E0001500000FFFFC0000505FE00030AFFFF00014E0001500000FFFFC0800509FE0003
KNRN 3F0005018C230AFFFF00014E8001500000FFFFC04005050140030AFFFF00014E8001500000FFFFC000
KNRN 3F000501AF2305060180030AFFFF00014E8001500000FFFFC0800503FE00030AFFFF00014E40015000
KNRN 3F000501D22300FFFFC0400501FE00030AFFFF00014E4001500000FFFFC00005070140030AFFFF00C1
KNRN 3F000501F5214E4001500000FFFFC0800508018OO30AFFFF00014E0001500000FFFF00000050D9

```
;*3*** "OR" PUSHBUTTON ACTIONS INTO WORK AREA FOR 1.MECH ***185+IN(107)+PB(43
;FUNCTION:    "OR" PUSHBUTTON ACTIONS INTO WORK AREA FOR 1 MECH
;ENTRY:       MECH=MECH NUMBER
;             MHPTRH/L=PHYSICAL START OF MECH HEADER
;             ZNUMB=ZONE# OF CURRENT MECH
;EXIT:        OUTPUT WORK AREA CONTAINS ACTIVE PUSHBUTTONS TO FLASH
;
     ;FIND INPUT MATCH LIST AND INPUT SELECTOR LIST
PBACT: MOV   A,ZNUMB              ;1 ZNUMB=ZONE# OF CURRENT MECH
       LCALL CTABLE               ;98 DPTR=PHYSICAL START OF INPUT MATCH LIST
       XSUM  (DPL,#06H,IMPTRL)    ;3
       XSUMC (DPH,#00H,IMPTRH)    ;3 IMPTRH/L=ADDR OF INPUT COMPARE MASK 1
       LCALL RDADDR               ;47 EXIT DPTR=PHYSICAL START OF SELECTOR LIST
       JZ    PBX                  ;2 IF NO COMPARE LIST, EXIT
       LCALL RDRAM                ;17 ACC=NUMBER OF ENTRIES IN LIST
       JZ    PBX                  ;2 IF NO ENTRIES EXIT
       MOV   COUNT,A              ;1 SET LOOP COUNT
       INC   DPTR                 ;2 DPTR=PHYSICAL ADDR OF INPUT SELECTION 1
       MOV   SPTRH,DPH            ;2
       MOV   SPTRL,DPL            ;2 SPTRH/L=PHYSICAL ADDR OF INPUT SELECTION 1
     ;READ NEXT ENTRY FROM INPUT SELECT LIST
.MECH: LCALL RDISEL               ;73 SELECT=INPUT SELECTOR
                                  ;IF TYPE0, PBMASK & TRMASK READ
     ;READ NEXT MASK FROM INPUT COMPARE LIST
       MOV   DPH,IMPTRH           ;2
       MOV   DPL,IMPTRL           ;2
       LCALL RDRAM                ;17
       MOV   MASK,A               ;1
       INC   DPTR                 ;2
       INC   DPTR                 ;2
       MOV   IMPTRL,DPL           ;2
       MOV   IMPTRH,DPH           ;2
     ;CHECK FOR TYPE 0 PUSHBUTTON (PHYSICAL PUSHBUTTON)
       JNB   TYPE0,PBZXIT         ;2 IF NOT TYPE 0, GOTO PBZXIT
     ;APPLY PB MASK
       MOV   A,PBMASK             ;1
       ANL   A,MASK               ;1 ACC=PB MASK "AND" ACTIVE MASK
       MOV   MASK,A               ;1 MASK=ACTIVE PUSHBUTTONS
```

```
;"OR" PUSHBUTTONS INTO FLASH WORK AREA
        XSUM    (SELECT,#80H,DPL)       ;3
        MOV     DPH,#PAGE4              ;2
        LCALL   RDRAM                   ;17
        ORL     A,MASK                  ;1
        LCALL   WRRAM                   ;17
;REPEAT FOR EACH ITEM IN ZONE COMPARE LIST
PBZXIT: DJNZ    COUNT,PBMECH            ;2
PBX:    RET                             ;2 RETURN FROM SUBROUTINE
``` zone z.1 returned
 maximum 1.0
 input off advanced.limit.switch
 input on returned.limit.switch
 output off advance.motion.pwr
 output off return.motion.pwr
 expect z.4 t;max.time
 error z.10 zone z.2 stopped between
 maximum 1.0
 input off acvanced.limit.switch
 input off returned.limit.switch
 output off advance.motion.pwr
 output off return.motion.pwr
 expect z.5 t;max.time
 error z.10 zone z.3 advanced
 maximum 1.0
 input on advanced.limit.switch
 input off returned.limit.switch
 output off advance.motion.pwr
 output off return.motion.pwr
 expect z.9 t;max.time
 error z.10 zone z.4 advancing from returned
 input off advanced.limit.switch
 input on returned.limit.switch
 output on advance.motion.pwr
 output off return.motion.pwr
 expect z.5 returned.limit.switch
 error z.10 zone z.5 advancing between
 input off advanced.limit.switch
 input off returned.limit.switch
 output on advance.motion.pwr
 output off return.motion.pwr
 expect z.6 advanced.limit.switch
 error z.10 zone z.6 advancing onto advanced
 maximum 1.0
 input on advanced.limit.switch
 input off returned.limit.switch
 output on advance.motion.pwr
 output off return.motion.pwr
 expect z.3 t;max.time
 error z.10 zone z.7 returning onto returned
 maximum 1.0
 input off advanced.limit.switch
 input on returned.limit.switch
 output off advance.motion.pwr
 output on return.motion.pwr
 expect z.1 t;max.time
 error z.10 zone z.8 returning between
 maximum 1.0

```
  input off advanced.limit.switch
  input off returned.limit.switch
  output off advance.motion.pwr
  output on return.motion.pwr
  expect z.7 returned.limit.switch
  error z.10 zone z.9 returning from advanced
  maximum 1.0
  input on advanced.limit.switch
  input off returned.limit.switch
  output off advance.motion.pwr
  output on return.motion.pwr
  expect z.8 advanced.limit.switch
  error z.10 zone z.10 error
  input ign advanced.limit.switch
  input ign returned.limit.switch
  output off advance.motion.pwr
  output off return.motion.pwr input 1 advanced.limit.switch na input 2 returned.limit.switch na output 1 na advance.motion.pwr output 2 na  return.motion.pwr
```

Zone Logic Error Analysis

```
/* Build the error input states character string */ zeb_berd(erl,erd)
 struct stolist *erl;
 struct errordat *erd;
{
  unsigned int i, j;
  char *errstate;
  char *zeb_gers();
  char errstr[129];
  char zon_gioc();
  char *mio_iofn();
  struct miodata *iblk;
  struct symbolb *slf_bsb();
  struct mechanism *mcs_fmb();
  struct mechanism *ermech = mcs_fmb(erd->estatid,erd->emechnum);
  strcpy(errstr,"        ");
  if (erd->cindbyte == 0xFD) errstr[1] = zon_gioc("ON");
  if (erd->chanbyte == 0xFE) errstr[2] = zon_gioc("ON");
  for (i = 3; i <= ermech->milist->list_count; i++)
    { iblk = ermech->milist->list[i];
      errstate = zeb_gers(erd,iblk->isbyte,iblk->bmask);
      errstr[i] = zon_gioc(errstate);
      slf_bsb(erl,erl,errstate,mio_iofn(iblk),'P','M');
    }
  errstr[i] = '\0';
  slf_bsb(erl,erl,"%errorinstates",errstr,'P','M');
}
/* Get the first expected exit from the logic module */ zeb_exzo(erd)
 struct errordat *erd;
{
  char sbuff[81];
  unsigned int extype;
  unsigned int mci_gze();
  unsigned int zxaddr = mci_gze(erd->estatid,erd->emechnum,erd->chanzone);
  erd->exitzone = 0;
```

```
  for (;;zxaddr += 4)
    { mci_rmds(erd->estatid,0xF,zxaddr,4,sbuff);
      if ((extype = extractx(sbuff,17,2)) == 0) return;
      if (extype == 5) break;
    }
  erd->exitzone = extractx(sbuff,19,2);
  erd->exitbyte = extractx(sbuff,21,2);
  erd->exitbit  = extractx(sbuff,23,2);
  erd->exitselb = mci_gisb(erd->estatid,erd->emechnum,
                           erd->exitzone,erd->exitbyte);
}
/* Fill the storage list with symbols for a zone and input */ zeb_fill(erl,erd,fzone,fselb,fbit,app)
 struct stolist *erl;
 struct errordat *erd;
 int fzone;
 int fselb;
 int fbit;
 char *app;
{
  struct miodata *vmio;
  char *iostate;
  char *mls_fzb();
  char *zeb_gers();
  char *togonoff();
  struct symbolb *slf_bsb();
  struct miodata *mls_fiob();
  if (fzone == 0) return;
  mls_fzb(erl,erd->estatid,erd->emechnum,fzone,app);
  vmio = mls_fiob(erl,erd->estatid,erd->emechnum,fselb,fbit,app);
  iostate = zeb_gers(erd,fselb,vmio->bmask);
  slf_bsb(erl,erl,"%errstate",iostate,'A','P',app);
  slf_bsb(erl,erl,"%expstate",togonoff(iostate),'A','P',app);
}
/* Get an error state from the raw data given a selector byte and mask */ char *zeb_gers(erd,sbyte,mask)
 struct errordat *erd;
 unsigned int sbyte;
 unsigned int mask;
{
  unsigned int i;
  for (i = 1; i <= erd->totsel; i++)
    {if (erd->selbys[i] == sbyte)
      {if (erd->errbys[i] & mask) return("ON");
       return("OFF");
      }
    }
  return("IGN");
}
/* Journal the error from the error listing */ zeb_jour(erl)
 struct stolist *erl;
{
  char *slf_gsbd();
  jcs_rjtl(slf_gsbd(erl,"%errortype"),erl);
}
/* Gather all the error data into a storage list of symbols */ zeb_list(sblock,erl,erd)
 struct screen *sblock;
 struct stolist *erl;
 struct errordat *erd;
{
  char *zeb_type(),*slf_rdss(),*etype;
  char *tline,tbuff[256],*etmplt,*sds_gstv();
  struct symbolb *slf_bsb();
  struct mechanism *mcs_fbsl();
  etype = zeb_type(erl,erd);
  slf_bsb(erl,erl,"%errortype",etype,'P','P');
```

```
    zeb_time(erl);
    zeb_raw(erl,erd);
    mcs_fbsl(erl,erd->estatid, erd->emechnum);
    zeb_mess(sblock,erl);
    zeb_fill(erl,erd, erd->chanzone, erd->chanselb, erd->chanbit, "from");
    zeb_fill(erl,erd, erd->cindzone, erd->cindselb, erd->cindbit, "to");
    zeb_fil  erl,erd, erd->exitzone, erd->exitselb, erd->exitbit, "exit");
    zeb_berd(erl,erd);
    etmplt = sds_gstv(etype,"display","no error template");
    tline = slf_rdss(erl,etmplt,tbuff,FALSE);
    slf_bsb(erl,erl,"%edisplay",tline,'P','M');
    zeb_jour(erl);
}
/* Fill in the error messages from the error listing */ zeb_mess(sblock,erl)
 struct screen *sblock;
 struct stolist *erl;
{
    char *slf_gsbrv();
    ses_resrv("MACHINE ERRORS","%errortype",slf_gsbrv(erl,"%errortype"));
    ses_resrv("MACHINE ERRORS","%station",slf_gsbrv(erl,"%station"));
    ses_resrv("MACHINE ERRORS","%stationid",slf_gsbrv(erl,"%stationid"));
    zes_ensy(sblock,"%mechanism",slf_gsbrv(erl,"%mechanism"));
    ses_veg(sblock,"error data",erl);
}
/* Write the raw (logic module) error data to a storage list */ zeb_raw(erl,erd)
 struct stolist *erl;
 struct errordat *erd;
{
    struct symbolb *slf_bsb();
    struct symbolb *slf_bsbi();
    struct symbolb *slf_bsbf();
    slf_bsbi(erl,erl,"%estatid", erd->estatid, 'P',"%04x");
    slf_bsbi(erl,erl,"%emechnum",erd->emechnum,'P',"%d");
    slf_bsbi(erl,erl,"%chanzone",erd->chanzone,'P',"%d");
    slf_bsbi(erl,erl,"%chanbyte",erd->chanbyte,'P',"%02x");
    slf_bsbi(erl,erl,"%chanselb",erd->chanselb,'P',"%02x");
    slf_bsbi(erl,erl,"%chanbit", erd->chanbit, 'P',"%02x");
    slf_bsbi(erl,erl,"%cindzone",erd->cindzone,'P',"%d");
    slf_bsbi(erl,erl,"%cindbyte",erd->cindbyte,'P',"%02x");
    slf_bsbi(erl,erl,"%cindselb",erd->cindselb,'P',"%02x");
    slf_bsbi(erl,erl,"%cindbit", erd->cindbit, 'P',"%02x");
    slf_bsbi(erl,erl,"%exitzone",erd->exitzone,'P',"%d");
    slf_bsbi(erl,erl,"%exitbyte",erd->exitbyte,'P',"%02x");
    slf_bsbi(erl,erl,"%exitselb",erd->exitselb,'P',"%02x");
    slf_bsbi(erl,erl,"%exitbit", erd->exitbit, 'P',"%02x");
    slf_bsbi(erl,erl,"%totsel",  erd->totsel,  'P',"%02x");
    slf_bsbi(erl,erl,"%rawztime",erd->zonetime,'P',"%04x");
    slf_bsbf(erl,erl,"%zonetime",(float)erd->zonetime/100,'P',"%.2f");
}
/* Return a pointer for error storage */ struct stolist *zeb_scad()
{
    int errsize;
    int max;
    unsigned int i;
    struct stolist *slf_ipsl();
    struct stolist *sds_gsla();
    struct stolist *macerrs = sds_gsla("MACHINE ERRORS");
    errsize = sds_gsdi("SINGLE ERROR SIZE",3000,"%d");
    max = macerrs->allocated - sizeof(struct stolist) - (2 * sizeof(char*))
    if (errsize > max) errsize = max;
    max = errsize + sizeof(struct stolist) + sizeof(char*);
    if (slf_cslm(macerrs) >= max)
        macerrs->list[0] = slf_ipsl(macerrs,macerrs,errsize);
```

```
  else
    {for (i = 1; i < macerrs->list_count; i++)
       if (macerrs->list[i] == macerrs->list[0]) break;
     i = vrapint(++i,1,macerrs->list_count);
     macerrs->list[0] = macerrs->list[i];
    }
  slf_csl(macerrs->list[0]);
  return(macerrs->list[0]);
}
/* Scan the machine for an error */ char *zeb_scan(sblock)
 struct screen *sblock;
{
  struct stolist *slf_asls();
  char mbuff[500];
  struct mechanism *mblock,*mcs_fbsl();
  struct stolist *mlist = slf_asls(mbuff,500);
  struct errordat ed;
  struct screen *overlay;
  struct screen *ses_mesl();
  struct stolist *zeb_scad();
  if(isoverly()) return(NULL);
  if (mci_gera(&ed) == FALSE) return(NULL);
  cif_dbse(ed.estatid,ed.emechnum);
  if((mblock = mcs_fbsl(mlist,ed.estatid,ed.emechnum)) == NULL) {
    mci_cler(ed.estatid);
    return(NULL);
  }
  overlay = ses_mesl(sblock,"error monitor","error data",mlist);
  mci_gerd(&ed);
  zeb_exzo(&ed);
  mci_cler(ed.estatid);
  zeb_list(overlay,zeb_scad(),&ed);
  reoverly();
  sgn_clr();
  return("error rewrite");
}
/* Get the time and date for this error collection */ zeb_time(erl)
 struct stolist *erl;
{
  char time[20];
  char date[20];
  struct symbolb *slf_bsb();
  gettime(time);
  getdate(date);
  slf_bsb(erl,erl,"%etime",time,'P','M');
  slf_bsb(erl,erl,"%edate",date,'P','M');
}
/* Get an error type string */ char *zeb_type(erl,erd)
 struct stolist *erl;
 struct errordat *erd;
{
  char *zeb_cinl();
  if (erd->emechnum == 0)      return("no errors");
  if (erd->chanbyte == 0xFE)
    {if (erd->cindbyte == 0)
      { if (erd->exitzone == 0) return("no exit");
        else                    return("late");
      }
     else                       return("late no zone fit");
    }
  if (erd->cindbyte == 0x00)   return("unexpected");
  if (erd->cindbyte == 0xFD)   return("early");
                               return("no zone fit");
}
/* Clear the error storage area and the error messages */
```

```
char *zes_cerr(sblock,sreturn)
 struct screen *sblock;
 char *sreturn;
{
   struct stolist *sds_gsla();
   struct stolist *macerrs = sds_gsla("MACHINE ERRORS");
   slf_csl(macerrs);
   ses_resrv("MACHINE ERRORS","%errorwatch","NO errors in memory");
   ses_resrv("MACHINE ERRORS","%errortype","");
   ses_resrv("MACHINE ERRORS","%station","");
   ses_resrv("MACHINE ERRORS","%stationid","");
   zes_ensy(sblock,"%mechanism","");
   return("error rewrite");
}
/* Set a machine error symbol and rewrite the machine error entities */ zes_ensy(sblock,esym,emsg)
 struct screen *sblock;
 char *esym;
 char *emsg;
{
   ses_resrv("MACHINE ERRORS",esym,emsg);
   if (sblock != NULL) ses_wekg(sblock,"machine errors");
}
/* Setup keyword return handlers for ZES zone error system */ zes_skrh()
{
   char *zes_cerr();
   ses_akra("ERROR CLEAR",zes_cerr);
}
/* set up storage area for error lists */ int zes_szes()
{
   char *pnull = NULL;
   char *zeb_scan();
   char *zes_cerr();
   char *sds_gsds();
   struct stolist *sds_aslsb();
   struct stolist *me = sds_aslsb("MACHINE ERRORS",
                       sds_gsdi("MACHINE ERRORS SIZE",8000,"%d"));
   if (me == NULL) return(procerr("memory alloc failure","MACHINE ERRORS"))
   zes_cerr(pnull,pnull);
   ses_abti("zeb_scan",zeb_scan,sds_gsds("MACHINE ERROR SYSTEM","ON"));
   return(TRUE);
}
```

The invention claimed is:

1. An apparatus for indicating errors in a machine comprising:
   means having a table containing a list of zone names, input/output names, input/output images for each zone and allowed zones for each said zone; and
   means having a stored input/output image and last valid zone name, and a memory containing a plurality of error designations and means for implementing an algorithm for generating an error message from said table and said stored data.

2. An apparatus for indicating errors in a machine comprising:
   means having a table containing a list of zone names, input/output names, input/output images for each zone and allowed zones for each said zone;
   a memory containing a plurality of error designations;
   means for formulating an error message from said table and memory indicative of said error condition; and
   means for implementing an algorithm which selects data from said table and combines the data with other fixed words to generate an error message.

3. An apparatus for indicating errors in a machine comprising:
   means having a table containing a list of zone names, input/output names, input/output images for each zone and allowed zones for each said zone;
   a memory containing a plurality of error designations;
   means for formulating an error message from said table and memory indicative of said error condition; and
   means for generating the error message from the names of the last valid zone and the input/output names that caused the input/output image to not match the last valid zone or any of the allowed next zones.

4. An apparatus for indicating an error condition of a machine comprising:
   means for looking up a zone name and an input/output name;
   means for determining an error designation from a plurality of error designations indicative of an error condition;

means for combining said zone name, said input/output name, and said error designation into an error message; and means for displaying said error message.

5. A method for indicating an error condition of an apparatus comprising the steps of:

looking up a zone name and an input/output image name;

determining an error designation from a plurality of error designations indicative of said error condition;

combining said zone name, said input/output name, and said error designation into an error message; and displaying said error message.

6. A method of indicating an error condition of an apparatus having at least one mechanism, one input, one output and a plurality of states of operation characterized by:

storing a unique zone name for each zone of said mechanism, storing a unique input/output name for each input/output, providing at least one template containing fixed words and blank spaces, and upon detecting an error, selecting zone and input/output names for insertion into the blanks of the appropriate template to generate a message using data stored upon detection of the error.

7. The method as set forth in claim 6 further characterized by:

saving the actual input/output image when leaving a zone, and using said image for selecting a next a zone and, if an error is detected, for generating the error message.

8. The method as set forth in claim 6 further characterized by:

generating a plain language text error message.

9. The method as set forth in claim 6 further characterized the step of storing a unique zone name includes storing at least one error zone name, indicating an error condition when, after determining to depart a present zone, no next zone can be selected, and entering the error zone.

10. The method as set forth in claim 6 further characterized by:

displaying an error message indicative of an error condition.

11. The method as set forth in claim 6 further characterized by:

recording an identifier of each zone that is departed and the actual time spent in that zone.

12. The method as set forth in claim 6 further characterized by:

recording the occurrence of each error in a journal.

13. The method of claim 6 further comprising the steps of:

storing a table containing a list of zone names, input/output names, input/output images for each zone and allowed zones for each said zone, storing in a memory of plurality of error designations, formulating an error message from said table and memory indicative of said error condition, and generating the error message from the names of the last valid zone and the input/output names that caused the input/output image to not match the last valid zone or any of the allowed next zones.

14. An apparatus for indicating an error condition in a machine having at least one mechanism, one input, one output and a plurality of states of operation characterized by:

means for storing a unique zone name for each zone of said mechanism, means for storing a unique input/output name for each input/output, means for providing at least one template containing fixed words and blank spaces, and means, upon detecting an error, for selecting zone and input/output names for insertion into the blanks of the appropriate template to generate the message using data stored upon detection of the error.

15. The apparatus of claim 14 further characterized by:

means for saving the actual input/output image when leaving a zone, and means for using said image for selecting a next zone and, if an error is detected, for generating the error message.

16. The apparatus of claim 14 further characterized by:

means for generating a plain language text error message.

17. The apparatus as set forth in claim 14 further characterized by:

the means for storing a unique zone name includes storing at least one error zone name, means for indicating an error condition when, after determining to depart a present zone, no next zone can be selected, and means for entering the error zone.

18. The apparatus of claim 14 further characterized by:

means for displaying an error message indicative of an error condition.

19. The apparatus of claim 14 further characterized by:

means for recording an identifier of each zone that is departed and the actual time spent in that zone.

20. The apparatus of claim 14 further characterized by:

means for recording the occurrence of each error in a journal.

21. The apparatus of claim 14 further characterized by:

means having a table containing a list of zone names, input/output names, input/output images for each zone and allowed zones for each said zone, a memory containing a plurality of error designations, means for formulating an error message from said table and memory indicative of said error condition, and means for generating the error message from the names of the last valid zone and the input/output names that caused the input/output image to not match the last valid zone or any of the allowed next zones.

* * * * *